(12) United States Patent
Schmidt et al.

(10) Patent No.: US 10,302,378 B2
(45) Date of Patent: May 28, 2019

(54) SUPPORT BEAM FOR COOLING TOWER FILL ASSEMBLY

(71) Applicant: Midwest Cooling Towers, Inc., Chickasha, OK (US)

(72) Inventors: Phillip Shane Schmidt, Chickasha, OK (US); Andrew M. Strain, Chickasha, OK (US)

(73) Assignee: Midwest Cooling Towers, Inc., Chickasha, OK (US)

( * ) Notice: Subject to any disclaimer, the term of this patent is extended or adjusted under 35 U.S.C. 154(b) by 0 days.

(21) Appl. No.: 15/880,660

(22) Filed: Jan. 26, 2018

(65) Prior Publication Data

US 2018/0216902 A1    Aug. 2, 2018

Related U.S. Application Data

(60) Provisional application No. 62/452,823, filed on Jan. 31, 2017.

(51) Int. Cl.
*F28F 25/08* (2006.01)
*F16L 3/00* (2006.01)

(52) U.S. Cl.
CPC .......... *F28F 25/082* (2013.01); *F28F 25/087* (2013.01); *F16L 3/003* (2013.01)

(58) Field of Classification Search
CPC ......... F28F 25/082; F28F 25/087; F16L 3/003
USPC ...................................... 211/118, 119, 181.1
See application file for complete search history.

(56) References Cited

U.S. PATENT DOCUMENTS

| 3,313,054 | A | * | 4/1967 | Madey | ................. A47F 5/0846 40/651 |
| 3,749,381 | A | | 7/1973 | Furlong et al. | |
| 3,894,127 | A | | 7/1975 | Fordyce | |
| 3,917,765 | A | | 11/1975 | Furlong et al. | |
| 4,178,333 | A | | 12/1979 | Shepherd | |
| 4,181,692 | A | * | 1/1980 | Stone | ....................... F28C 1/02 248/228.1 |
| 4,451,411 | A | | 5/1984 | Lefevre | |
| 4,591,057 | A | * | 5/1986 | Garfinkle | ............. A47F 5/0807 211/106 |
| D415,292 | S | | 10/1999 | Giese | |
| D474,286 | S | | 5/2003 | Gregori | |

(Continued)

OTHER PUBLICATIONS

"Fill Hangers." Riverdale Mills Corporation. Retrieved from the Internet: http://riverdale.com/products/fill-hangers/, Dec. 7, 2016.

(Continued)

*Primary Examiner* — Ko H Chan
(74) *Attorney, Agent, or Firm* — Dunlap Codding, P.C.

(57) ABSTRACT

A support beam for a cooling tower fill assembly includes a web, an upper flange, a lower flange, and a lip. The web has a serpentine shape so a lower end of the web is vertically offset relative to an upper end. The upper flange extends from a first side of the web at the upper end thereof. The lower flange has a first portion extending from the first side at the lower end thereof and a second portion extending from a second side at the lower end thereof. The lip extends upwardly from the second portion so the lip cooperates with the second portion and a portion of the web to form a longitudinal channel. The lip and the second portion are provided with a plurality of spaced apart notches.

8 Claims, 3 Drawing Sheets

(56) References Cited

U.S. PATENT DOCUMENTS

| | | | |
|---|---|---|---|
| 6,571,968 B1 * | 6/2003 | Cullen | B05B 5/082 |
| | | | 118/500 |
| D547,883 S * | 7/2007 | Aughton | D25/119 |
| 7,618,026 B2 | 11/2009 | Armstrong | |
| D697,232 S | 1/2014 | Herman | |
| 8,646,624 B2 * | 2/2014 | Fernandez | A47B 45/00 |
| | | | 108/108 |
| D702,466 S | 4/2014 | Kim | |
| D709,629 S | 7/2014 | Rice | |
| D780,942 S | 3/2017 | Krause | |
| D780,943 S | 3/2017 | Krause | |
| D787,094 S | 5/2017 | Britton | |
| D787,709 S | 5/2017 | Krause | |
| D800,347 S | 10/2017 | Blick | |
| D813,418 S | 3/2018 | Ewoldt | |
| D815,758 S | 4/2018 | Hendry | |
| 2006/0102817 A1 * | 5/2006 | Swartz | A47B 55/02 |
| | | | 248/243 |
| 2015/0211818 A1 | 7/2015 | Krell et al. | |

OTHER PUBLICATIONS

"Splash Fill Systems." C.E. Shepherd Company. Retrieved from the Internet: http://www.ceshepherd.com/splash_fills.html, Dec. 7, 2016.

* cited by examiner

SUPPORT BEAM FOR COOLING TOWER FILL ASSEMBLY

CROSS REFERENCE TO RELATED APPLICATION

This application claims priority to U.S. Provisional Application Ser. No. 62/452,823, filed on Jan. 31, 2017, the entire contents of which are incorporated herein by reference.

BACKGROUND

Cooling towers of varying designs are widely used in industry to remove waste heat from a process by natural evaporation of the cooling fluid. Cooling towers typically utilize a grid work of overhead nozzles to form a plurality of overlapping spray patterns to distribute hot water over the upper surface of a layer of fill material through which air is drawn. The water flows downward through the fill material as the air flows upward through or across the fill material whereby the heat of the water is transferred to the air.

The fill material utilized depends upon the tower application, which varies widely based on many factors. Fill types are "film fill" and "splash fill." Film fill consists of thin, closely placed plastic surfaces over which the water spreads forming a thin film in contact with air. Many film fill structures exist, including corrugated and honeycombed structures. Film fill structures are typically supported within the cooling tower by placing the structures on a support surface or structure.

Splash fill consists of layers of vertically offset splash bars or slats which cause the falling water to spread and break into small droplets. Splash fill requires a support system to position the splash bars at the appropriate location in the cooling tower for proper operation. Typical support systems include support grids, commonly called hanger grids. The hanger grids are a mesh of perpendicular members usually spaced at fixed dimensions of 4 inches horizontally and either 4 or 8 inches vertically to form windows within which the splash bars are supported on the horizontal members.

The hanger grids are typically suspended from a support beam spanning a portion of the cooling tower. The support beam is often a piece of lumber, and the hanger grid is suspended from a bracket mounted to one side of the support beam. The load of multiple grids with multiple splash bars being impacted by the falling water applies a significant stress to the support beam, which can lead to deflection of the support beam and/or rotation of the support beam due to the tangential load applied to the bracket mounted on the side of the support beam. Either situation can lead to the position of the splash bars being altered, which can cause the cooling tower operating less efficiently, or to the failure of the support beam.

A need exists for a support beam that is durable, economical to manufacture, and simple to install. It is to such a support beam that the inventive concepts disclosed are directed.

DETAILED DESCRIPTION OF EXEMPLARY EMBODIMENTS

Figure 1:
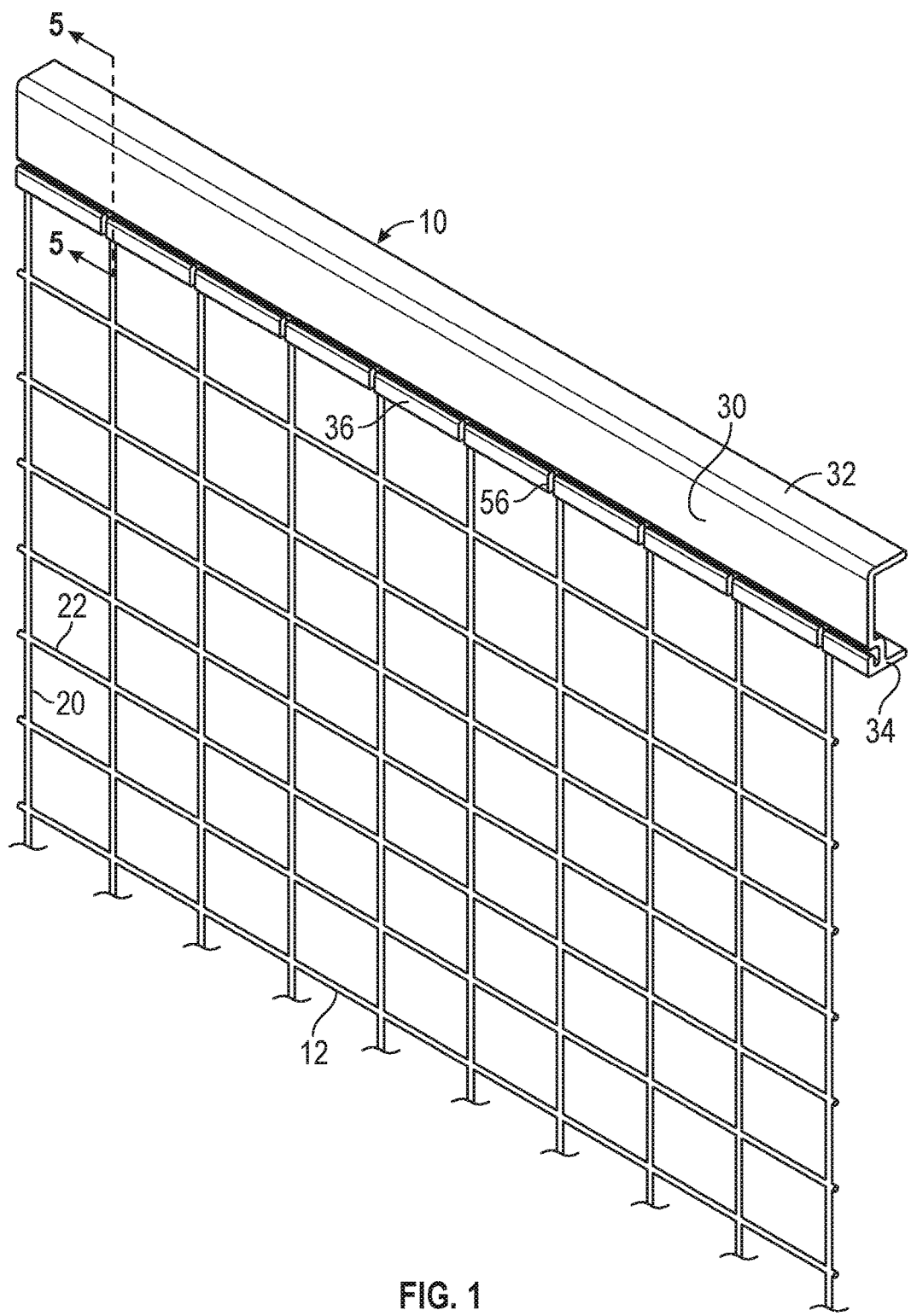
FIG. 1 is a perspective view of a support beam constructed under the inventive concepts disclosed shown supporting a hanger grid of a cooling tower fill assembly.

Before explaining at least one embodiment of the inventive concepts, it is to be understood that the inventive concepts disclosed are not limited in its application to the details of construction, experiments, exemplary data, and the arrangement of the components in the following description or illustrated in the drawings. The inventive concepts are capable of other embodiments or being practiced or carried out in various ways. Also, it is to be understood that the phraseology and terminology employed is for description and should not be limiting.

In this detailed description of embodiments of the inventive concepts, numerous specific details are in order to provide a more thorough understanding of the inventive concepts. However, it will be apparent to one of ordinary skill in the art that the inventive concepts within the disclosure may be practiced without these specific details. In other instances, certain well-known features may not be described to avoid unnecessarily complicating the disclosure.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not listed or inherently present.

Unless stated to the contrary, "or" refers to an inclusive or and not to an exclusive or. For example, a condition A or B is satisfied by anyone of: A is true (or present) and B is false (or not present), A is false (or not present) and B is true (or present), and both A and B are true (or present).

The term "and combinations thereof" as used herein refers to all permutations or combinations of the listed items preceding the term. For example, "A, B, C, and combinations thereof" should include at least one of: A, B, C, AB, AC, BC, or ABC, and if order is important in a particular context, also BA, CA, CB, CBA, BCA, ACB, BAC, or CAB. Continuing with this example, included are combinations that contain repeats of one or more item or term, such as BB, AAA, AAB, BBC, AAABCCCC, CBBAAA, CABABB, and so forth. A person of ordinary skill in the art will understand that typically there is no limit on the number of items or terms in any combination, unless otherwise apparent from the context.

In addition, use of the "a" or "an" are employed to describe elements and components of the embodiments herein. This is done merely for convenience and to give a general sense of the inventive concepts. This description should be read to include one or at least one and the singular also includes the plural unless it is meant otherwise.

Using the terms "at least one" and "one or more" will be understood to include one and any quantity more than one, including but not limited to each of, 2, 3, 4, 5, 10, 15, 20, 30, 40, 50, 100, and all integers and fractions, if applicable, therebetween. The terms "at least one" and "one or more" may extend up to 100 or 1000 or more, depending on the term to which it is attached; in addition, the quantities of 100/1000 are not to be limiting, as higher limits may also produce satisfactory results.

Further, as used herein any reference to "one embodiment" or "an embodiment" means that a particular element, feature, structure, or characteristic described in the embodiment is included in at least one embodiment. The appearances of the phrase "in one embodiment" in various places in the specification are not necessarily all referring to the same embodiment.

As used herein qualifiers such as "about," "approximately," and "substantially" are intended to signify that the item being qualified is not limited to the exact value specified, but includes slight variations or deviations therefrom, caused by measuring error, manufacturing tolerances, stress exerted on various parts, wear and tear, and combinations thereof, for example.

Figure 2:
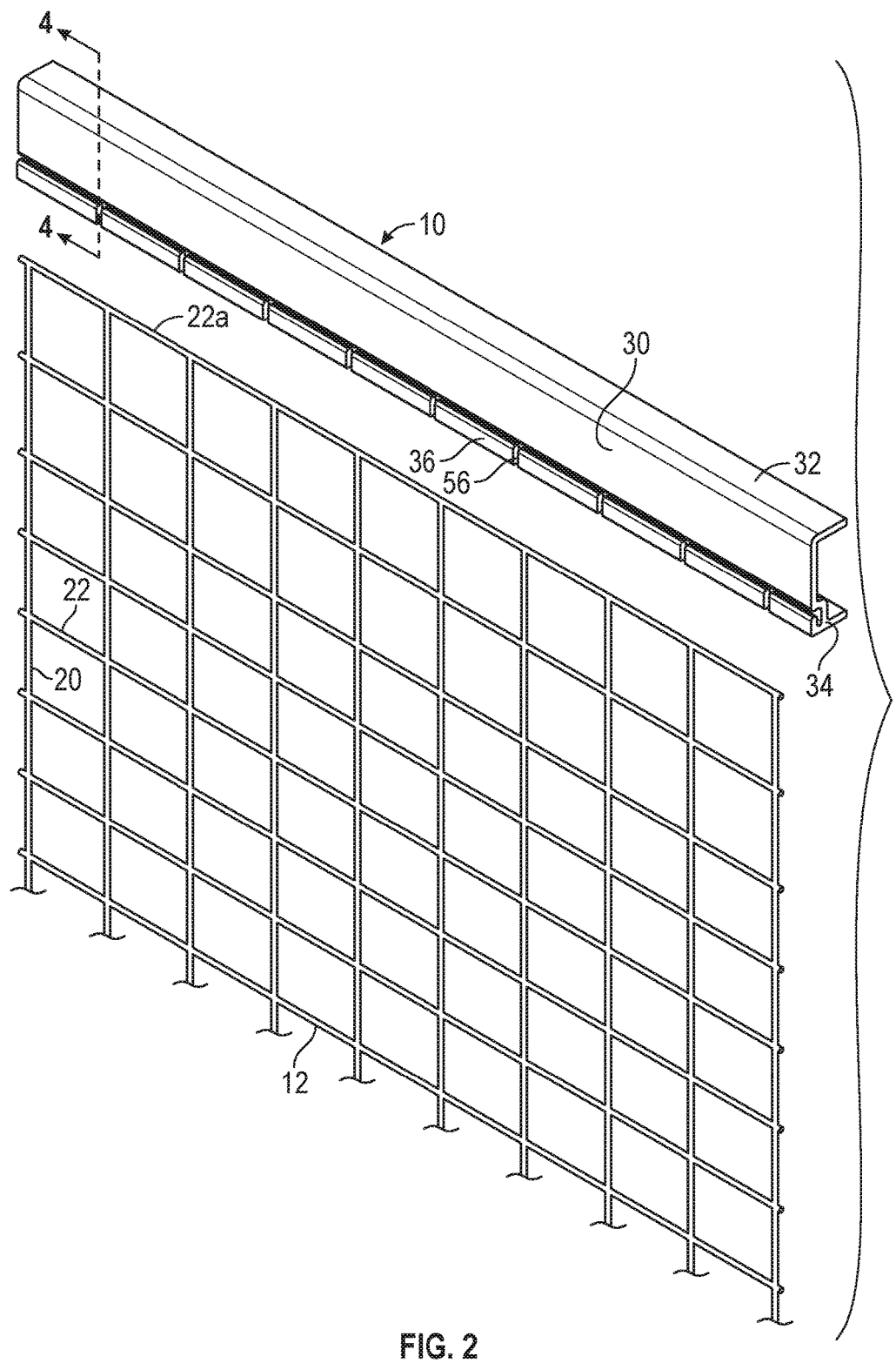
FIG. 2 is an exploded, perspective view of the support beam and the hanger grid of FIG. 1.
Figure 3:
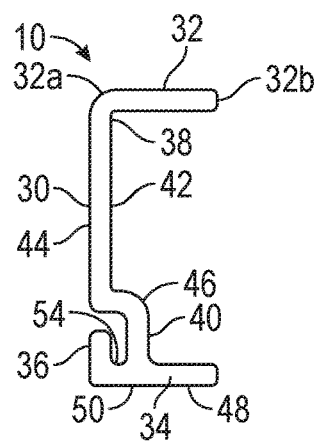
FIG. 3 is an end view of the support beam.
Figure 4:
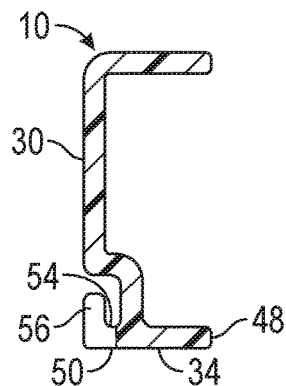
FIG. 4 is a sectional view taken along line 4-4 of FIG. 2.
Figure 5:
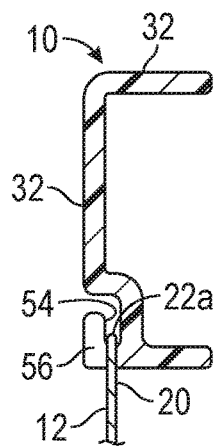
FIG. 5 is a sectional view taken along line 5-5 of FIG. 1.

Referring now to the drawings, and in particular FIGS. 1 and 2, a support beam 10 constructed under the inventive concepts disclosed is shown supporting a hanger grid 12. The hanger grid 12 is used combined with other hanger grids 12 to support a plurality of splash bars or slats (not shown). The hanger grids 12 are suspended from corresponding support beams 10, which are mounted in a cooling tower. Each of the support beams 10 is mounted to support walls of the cooling tower in a conventional manner, such as with fasteners (e.g., mounting bolts). However, it will be understood that other methods of mounting the support beam 10 to the wall of the tower can also be employed. A second support beam (not shown) would be positioned adjacent the first support beam 10 and spaced therefrom by a specified distance. Although only the support beam 10 has been shown in FIGS. 1 and 2, it will be understood that additional support beams 10 may be provided as necessary to accomplish the desired cooling effect of the liquid gravitating through the cooling tower. The support beam 10 may support many hanger grid designs, including metal and plastic.

The hanger grid 12 includes a mesh formed of vertically extending wire members 20 and horizontally extending wire members 22. The wire members 20 and 22 are rigidly secured to each other at each point of intersection by welding or the like, in known manner, to provide the hanger grid 12 with the desired vertical and horizontal dimensions. In the form shown, the spacing between the vertical wire members 20 is equal to the space between the horizontal wire members 22, although it will be understood that any desired vertical or horizontal spacing can be provided to form the desired mesh opening formed by adjacent wire members. For example, the vertical wire members 20 may be spaced approximately 4 inches apart and the horizontal wire members 22 approximately 4 inches apart defining a mesh opening of 4 inches by 4 inches.

The spacing of the vertical wire members must be such as to accommodate the slash bars (not shown). In each section of the hanger grid 12 between vertical wire members 20, the splash bars are positioned on every other wire member so that liquid gravitating through the cooling tower is forced along a discontinuous path, with the vertical distance between adjacent splash bars controlling the distance of the drop of the liquid. As above described, the dropping produces splashing breaking up the liquid into particles more susceptible to the air circulated for cooling through the tower. Although air circulation means have not been diagrammatically shown in FIG. 1, it will be understood that air is supplied in the amounts and velocity to the cooling tower to effect the desired cooling. It will also be understood that the width of the splash bars corresponds to the spacing between the vertical wire members 20 to prevent dropping of the liquid entirely through the tower without contacting each fill slat in the path of the liquid.

Referring now to FIGS. 1-5, the support beam 10 is a structural member that generally resembles a structural channel (also known as a C-beam or C-channel). The support member includes a web 30, an upper flange 32, a lower flange 34, and a lip 36. The web 30 has an upper end 38, a lower end 40, a first side 42, and a second side 44. In contrast to a conventional structural channel, at least a portion of the web 30 has a serpentine shape, designated at 46, so the lower end 40 of the web 30 is vertically offset relative to the upper end 38. The upper flange 32 has a proximal end 32a and a distal end 32b. As with a conventional structural channel, the upper flange 32 extends from the first side 42 of the web 30 at the upper end 38 thereof.

The lower flange 34 has a first portion 48 extending from the first side 42 of the web 30 at the lower end 40 thereof and a second portion 50 extending from the second side 44 of the web 30 at the lower end 40 thereof.

The lip 36 extends upwardly from the second portion 50 of the lower flange 34 at a distal end of the second portion 50 so the lip 36 cooperates with the second portion 50 of the lower flange 34, and a portion of the web 30 to form a longitudinal channel 54. The channel 54 is sized to receive an uppermost horizontal wire member 22a (FIG. 5) of the hanger grid 12. The lip 36 and the second portion 50 of the lower flange 34 are provided with a plurality of spaced apart notches 56 for receiving the vertical wire members 20 of the hanger grid 12 when the uppermost horizontal wire member 22a is positioned in the channel 54. Each notch 56 can be provided with a radius to reduce stress concentrations at the points where the wire members 20 extend through the support beam 10. The number of notches 56 corresponds to the number of vertical wire members 20 of the hanger grid 12, with the spacing of the notches 56 corresponding to the spacing of the vertical wire members 20.

The support beam 10 can resemble a conventional structural channel. The support beam 10 may be formed to have many dimensions. For example, in one version the support beam 10 may be formed to have thickness of ¼ inch, a width of 1½ inches, and a height of 3½ inches. Similarly, the length of the support beam 10 may be varied. In one version, the length of the support beam 10 may be 12 feet. The configuration of the support beam 10 is so the overall external dimension of the support beam 10 resembles a conventional structural channel. The distal end 32b of the upper flange 32 and a distal end 60 of the first portion 48 of the lower flange 34 are vertically aligned. Similarly, the upper end 38 of the web 30 is vertically aligned with the lip 36.

Various materials and manufacturing methods can form the support beam 10 if the material used has the strength, including the tensile strength, to support the anticipated load and is durable and resistant to degradation in the operating environment of the cooling towers. The support beam 10 must support the hanger grids 12 and the splash bars so the splash bars do not appreciably change position along the continuous length of the support beam 10 during all anticipated environmental and operating conditions within the cooling tower. With these required characteristics, exemplary materials, without limitation, for forming the support beam 10 include metals, such as stainless steel and titanium, or synthetic materials, such as Kevlar® aramid fibers, fiber reinforced plastic, also called fiber reinforced polymer (known in the industry as "FRP"). The fibers of FRPs may be glass, carbon, basalt or aramid, among others, and the polymer is usually an epoxy, vinyl ester or polyester thermosetting plastic, among others. In one version, the support beam 10 may be formed using a pultrusion process. The notches 56 may be formed in a secondary process using any suitable cutting tool, such as a CNC machine.

From the above description, the inventive concepts disclosed and claimed herein are well adapted to carry out the objects and to attain the advantages mentioned, and those inherent in the invention. While exemplary embodiments of the inventive concepts have been described for this disclosure, it will be understood that numerous changes may be made which will readily suggest themselves to those skilled in the art and which are accomplished within the spirit of the inventive concepts disclosed and/or defined in the appended claims.

What is claimed is:

1. A support beam for a cooling tower fill assembly, comprising:
   a web having an upper end, a lower end, a first side, and a second side, at least a portion of the web having a serpentine shape so the lower end is vertically offset relative to the upper end;
   an upper flange extending from the first side of the web at the upper end thereof;
   a lower flange having a first portion extending from the first side of the web at the lower end thereof and a second portion extending from the second side of the web at the lower end thereof, the second portion of the lower flange having a distal end; and
   a lip extending upwardly from the second portion of the lower flange at the distal end thereof so the lip cooperates with the second portion of the lower flange and a portion of the web to form a longitudinal channel for receiving an uppermost horizontal wire member of a hanger grid of the cooling tower fill assembly, the lip and the second portion of the lower flange having a plurality of spaced apart notches formed for receiving a plurality of vertical wire members of the hanger grid.

2. The support beam of claim 1, wherein the support beam is fabricated of fiber reinforced polymer.

3. A support beam for a cooling tower fill assembly, comprising:
   a web having an upper end, a lower end, a first side, and a second side, at least a portion of the web having a serpentine shape so the lower end is vertically offset relative to the upper end;
   an upper flange extending from the first side of the web at the upper end thereof;
   a lower flange having a first portion extending from the first side of the web at the lower end thereof and a second portion extending from the second side of the web at the lower end thereof, the second portion of the lower flange having a distal end; and
   a lip extending upwardly from the second portion of the lower flange at the distal end thereof so the lip cooperates with the second portion of the lower flange and a portion of the web to form a longitudinal channel for receiving an uppermost horizontal wire member of a hanger grid of the cooling tower fill assembly, the lip and the second portion of the lower flange having a plurality of spaced apart notches formed for receiving a plurality of vertical wire members of the hanger grid,
   wherein the upper flange has a proximal end and a distal end,
   wherein the first portion of the lower flange has a distal end, and wherein the distal end of the upper flange and the distal end of the first portion of the lower flange are vertically aligned.

4. The support beam of claim 3, wherein the upper end of the web is vertically aligned with the lip.

5. A support beam in combination with a cooling tower fill assembly having a hanger grid having a plurality of horizontal wire member members and vertical wire members connected to one another, the support beam comprising:
   a web having an upper end, a lower end, a first side, and a second side, at least a portion of the web having a serpentine shape so the lower end is vertically offset relative to the upper end;
   an upper flange extending from the first side of the web at the upper end thereof;
   a lower flange having a first portion extending from the first side of the web at the lower end thereof and a second portion extending from the second side of the web at the lower end thereof, the second portion of the lower flange having a distal end; and
   a lip extending upwardly from the second portion of the lower flange at the distal end thereof so the lip cooperates with the second portion of the lower flange and a portion of the web to form a longitudinal channel in which an uppermost horizontal wire member of the hanger grid is received, the lip and the second portion of the lower flange having a plurality of spaced apart notches formed through which the vertical wire members of the hanger grid extend.

6. The support beam of claim 5, wherein the support beam is fabricated of fiber reinforced polymer.

7. A support beam in combination with a cooling tower fill assembly having a hanger grid having a plurality of horizontal wire member members and vertical wire members connected to one another, the support beam comprising:
   a web having an upper end, a lower end, a first side, and a second side, at least a portion of the web having a serpentine shape so the lower end is vertically offset relative to the upper end;
   an upper flange extending from the first side of the web at the upper end thereof;
   a lower flange having a first portion extending from the first side of the web at the lower end thereof and a second portion extending from the second side of the web at the lower end thereof, the second portion of the lower flange having a distal end; and
   a lip extending upwardly from the second portion of the lower flange at the distal end thereof so the lip cooperates with the second portion of the lower flange and a portion of the web to form a longitudinal channel in which an uppermost horizontal wire member of the hanger grid is received, the lip and the second portion of the lower flange having a plurality of spaced apart notches formed through which the vertical wire members of the hanger grid extend,
   wherein the upper flange has a proximal end and a distal end, wherein the first portion of the lower flange has a distal end, and wherein the distal end of the upper flange and the distal end of the first portion of the lower flange are vertically aligned.

8. The combination of claim 7, wherein the upper end of the web is vertically aligned with the lip.